United States Patent
Hejdeman et al.

(10) Patent No.: US 7,519,005 B2
(45) Date of Patent: Apr. 14, 2009

(54) SINGLE-WIRE COMMUNICATION BUS FOR MINIATURE LOW-POWER SYSTEMS

(75) Inventors: Carl Hejdeman, Basingstoke (GB); Victor Marten, Flushing, NY (US); Andrew McKnight, Southampton (GB)

(73) Assignee: Semtech Corp., Camarillo, CA (US)

( * ) Notice: Subject to any disclaimer, the term of this patent is extended or adjusted under 35 U.S.C. 154(b) by 984 days.

(21) Appl. No.: 10/480,757

(22) PCT Filed: Apr. 28, 2003

(86) PCT No.: PCT/US03/12959

§ 371 (c)(1),
(2), (4) Date: Jun. 4, 2004

(87) PCT Pub. No.: WO03/096036

PCT Pub. Date: Nov. 20, 2003

(65) Prior Publication Data

US 2004/0208200 A1    Oct. 21, 2004

Related U.S. Application Data

(60) Provisional application No. 60/379,374, filed on May 8, 2002.

(51) Int. Cl.
*G01R 31/08* (2006.01)
(52) U.S. Cl. .................. 370/252; 370/445; 370/301; 710/110; 340/825.52; 713/600
(58) Field of Classification Search .................. None
See application file for complete search history.

(56) References Cited

U.S. PATENT DOCUMENTS

| 4,689,740 | A | | 8/1987 | Moelands et al. |
| 5,237,322 | A | * | 8/1993 | Heberle ............ 340/870.13 |
| 5,321,818 | A | * | 6/1994 | Wendling et al. ........ 710/110 |
| 5,412,644 | A | | 5/1995 | Herberle |
| 5,495,240 | A | | 2/1996 | Heberle |
| 5,579,299 | A | | 11/1996 | Halter et al. |
| 5,761,697 | A | * | 6/1998 | Curry et al. .............. 711/100 |
| 5,864,872 | A | | 1/1999 | Lee et al. |
| 6,065,824 | A | | 5/2000 | Bullock et al. |
| 6,108,751 | A | | 8/2000 | Lee et al. |
| 6,298,066 | B1 | | 10/2001 | Wettroth et al. |
| 6,412,072 | B2 | | 6/2002 | Little et al. |
| 6,501,342 | B2 | | 12/2002 | Marten |
| 2003/0149819 | A1 | * | 8/2003 | Smith et al. ............. 710/100 |

* cited by examiner

*Primary Examiner*—Duc C Ho
(74) *Attorney, Agent, or Firm*—Oppedahl Patent Law Firm LLC

(57) ABSTRACT

A single-wire serial communications bus has a master device and one or more slave devices. The slave devices are addressed according to a predetermined addressing scheme in an address space. The master device starts a transmission with a number of line state changes which define a clock period to be used by the slave devices in clocking and framing the serial data. This permits omitting a clock line, thus saving a pin and saving printed circuit board space. This also permits the slave devices to shut down their own clocks during periods of inactivity on the bus, thus saving power. Likewise the master device is able to shut down its clock during periods of bus inactivity.

44 Claims, 4 Drawing Sheets

Fig2 Write Transaction

Fig3 Read Transaction

SINGLE-WIRE COMMUNICATION BUS FOR MINIATURE LOW-POWER SYSTEMS

CROSS-REFERENCE TO RELATED APPLICATIONS

This application claims priority from U.S. appl. No. 60/379,374 filed May 8, 2002, which application is hereby incorporated herein by reference.

BACKGROUND OF INVENTION

The invention relates generally to serial communications buses and relates more particularly to single-wire asynchronous serial communications buses.

In order to simplify modern miniature apparatus, it is desirable to have as few as possible physical connections between different ICs or modules comprising the miniature device. Then a smaller number of pins could be sufficient (which has a favorable price impact), and less printed circuit board area required for wiring. At the same time, it is desirable to operate at the lowest possible power consumption, so that the apparatus will be functional for as long as possible on the same set of batteries or a single charge of the batteries.

Such pressures—minimizing pin count, minimizing connections, and minimizing power consumption—present themselves with many modern apparatus, including such products as notebook computers, smart batteries, cell phones, and personal digital assistants. It is also desirable that any communications bus be simple to use. If the bus defines one device as a "master" and others as "slaves" then it is desirable that the bus permit a slave to request service from the master device.

It is also desirable to have a bus that operates in such a way that any conflict between line drivers in bus devices is prevented. For example if there are "master" and "slave" devices, it is desirable to prevent conflicts where one device attempts to drive the bus high and another device attempts to drive the bus low.

A variety of single-wire serial buses have been proposed, among them "Single wire data communication method," U.S. Pat. No. 6,108,751; "Single wire communication system," U.S. Pat. No. 5,864,872; "Communications network, a dual mode data transfer system therefor," U.S. Pat. No. 5,579,299; "Method and apparatus for storing information on a replaceable ink container," U.S. Pat. No. 6,065,824; "Parasitically powered microprocessor capable of transmitting data over a single data line and ground," U.S. Pat. No. 6,412,072; and "Serial bus system with a single-wire line," U.S. Pat. No. 5,412,644. Other serial buses which have been proposed include "Two-wire bus-system comprising a clock wire and a data wire for interconnecting a number of stations," U.S. Pat. No. 4,689,740.

SUMMARY OF INVENTION

A single-wire serial communications bus has a master device and one or more slave devices. The slave devices are addressed according to a predetermined addressing scheme in an address space. The master device starts a transmission with a number of line state changes which define a clock period to be used by the slave devices in clocking and framing the serial data. This permits omitting a clock line, thus saving a pin and saving printed circuit board space. This also permits the slave devices to shut down their own clocks during periods of inactivity on the bus, thus saving power. Likewise the master device is able to shut down its clock during periods of bus inactivity.

DETAILED DESCRIPTION

The single-wire communication bus for miniature low-power systems described as herein fulfills the requirements mentioned above, and includes other enhancements pertaining to simplicity of use. It permits a slave to request service from the master unit by generating an interrupt using the same single wire.

Figure 1:
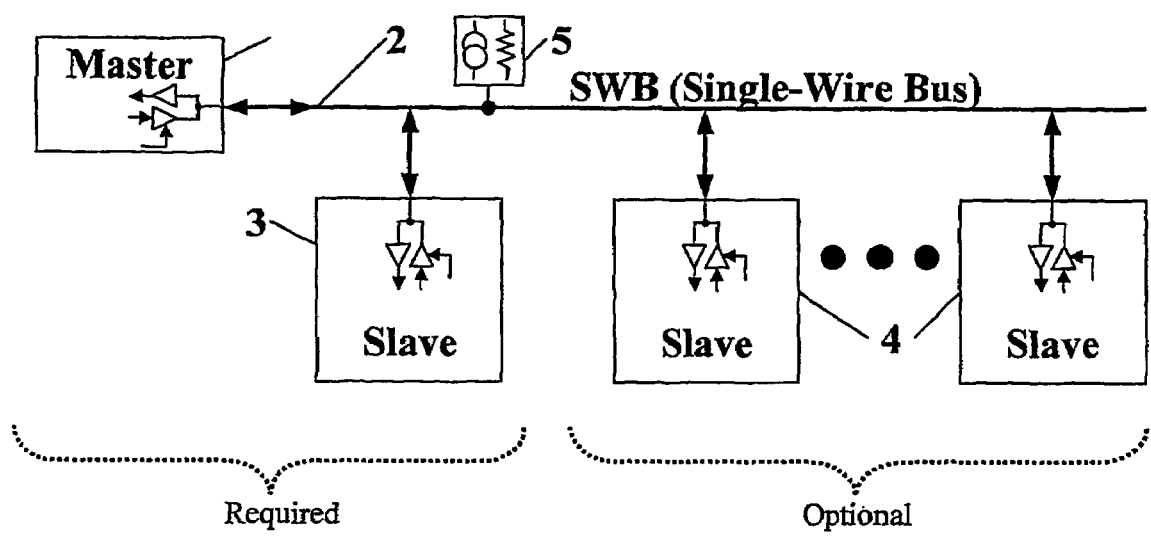
FIG. 1 is a functional block diagram showing a single-wire serial bus with master and slaves according to the invention.

Referring to FIG. 1, what is shown is a single-wire serial communication bus (sometimes called "SWB") according to the invention. A master 1 may be seen as well as the single-wire bus 2. There is at least one slave 3 and there are optionally additional slaves 4. A pull-up resistor 5 is shown, about which more will be said later. Each device, master and slave, has an input device, such as a comparator or line receiver, permitting the device to learn whether the bus is at a high or low state. Each device, master and slave, preferably has a tri-state output device (line driver) permitting the device to pull the bus high or low.

Those skilled in the art will appreciate that it would be possible to operate such a bus with drivers that are not tri-state drivers, for example with simple open-collector/open-drain drivers and a common pull-up or pull-down resistor. Such an approach would also have the advantage of assured freedom from bus contention, defined as the situation when one device trying to drive the bus to one state, and another device is trying to drive the bus to the opposite state. There are, however, significant advantages for utilizing tri-state drivers as described herein. These advantages include:

Power consumption. When a logic state opposite to the pull-up/pull-down is transmitted, there will be current expended, for the duration of one bit time. This current could be quite significant if a high data rate is desired. It leads for example to power dissipation in the pull-up/pull-down resistor for the duration of the logic state.

Speed. Bus capacitance in combination with the resistive pull-up/pull-down device will follow a simple RC time constant as the bus line recharges to the inactive state. This fact has been known to create problems in existing busses such as that described in the above-mentioned U.S. Pat. No. 4,689,740, when they are operated at any but the slowest of speeds.

It is possible to utilize current source/sink circuits (instead of simple open-collector/open-drain drivers), with marginal improvement of the recharge time, and it is possible to utilitize even more complex schemes with variable current. These add to the complexity of the bus drivers and may not be stable when significant noise is present.

Thus, while open-collector/open-drain drivers may be used, it is considered preferable to use tri-state drivers, namely drivers which are able to drive the bus actively to either of two states. With tri-state drivers, in the idle state, the bus is lightly pulled-up or pulled-down, but during the transaction, the bus is driven hard to the appropriate state. Of course a potential disadvantage of this approach (tri-state drivers rather than open-collector/open-drain drivers) is the possibility, however remote, of bus contention as mentioned above. But as is discussed in some detail below, the protocol devised for the bus according to the invention is a protocol with a number of features that are intended to minimize or eliminate contention, and indeed these very features are what make possible the use of tri-state drivers and thus the above-described power savings and speed enhancement Stated differently, the design of the protocol described herein helps to save power and enhance speed, when compared with other protocols.

It should be mentioned as a matter of terminology that the term "single-wire" in this context assumes a presence of a ground reference connection. The ground is provided by some other pin on each device and does not add to the pin count when used as a reference for this bus. The terminology "single-wire" in this context implies that only a single supplementary wire is required in addition to existing power and ground connections.

It should also be mentioned that as a matter of convenient vocabulary for discussion of the invention, we may refer to the bus as being "high" in a quiescent state and being "pulled low" by a driver. Yet as those skilled in the art will appreciate, this is merely an arbitrary choice to be made by a designer of a system. The bus could be defined as "low" in a quiescent state with drivers that pull it "high" instead.

In a particular system, such as a system in which each device uses a +5V power supply, it may be convenient to define "high" as being at or near 5 volts, and to define "low" as being at or near 0 volts. But as those skilled in the art will appreciate, the teachings of the invention may be applied equally well to a bus where the "high" and "low" levels are defined differently, for example a bus in a system where the native power distributed is at some other voltage, such as a voltage smaller than 5 volts.

Bus topology. The bus topology, mentioned briefly above, will now be described in some detail.

Again referring to FIG. 1, the single-wire communication bus 2 includes at least a single master 1 and one slave 3 device. Optionally, many slave 4 devices can also be connected to the same bus 2. For example as will be described below, in an exemplary embodiment the slave devices may sit in an "address space" of five bits, meaning there could be up to thirty-two distinct slave devices.

For the full functionality of the bus, each of the devices connected to the bus should have a pin dedicated to operations of the bus, with an input buffer (preferably interrupt-capable) and an output driver (with float/tri-state ability). A current source/sink or resistive device 5 with weak pull-up or pull-down capability should also be present, either one per whole system, or included in one or all devices.

The polarity of the interrupt signal and corresponding (opposing) connection of the pull-up/down mechanism 5 should be the same for all of the units connected to the bus.

Clocks. The operations of the bus are characterized by the absence of any requirement to have an accurate clock source at either master or slaves, as the required transmission speed is determined (calibrated) for each and every transaction from the bit pattern in the "Start Field." So far as the master device is concerned, its clock must be stable, in the sense that it will generate clock pulses with very nearly constant period. But its clock need not be particularly accurate, in the sense that it could operate at one frequency for a particular transmission and at another frequency for another transmission. Likewise it could operate at a higher or lower frequency so long as every one of the slave devices is able to follow. For example, for the various slave devices each will have some upper limit as to how fast its own clock can run in response to the calibration pulses from the master. Clearly the master must confine its clock not to exceed the abilities of the slowest of the slave devices when considered according to their respective upper clock limits. The cumulative drift over the period of time for a bus message needs to be small, probably well less than one-half of a bit time.

Likewise so far as each slave device is concerned, its clock must likewise be stable in the sense that it will generate clock pulses with very nearly constant period, with drift that is small enough that the cumulative drift over the period of time needed for a bus message will be small, probably well less than one-half of a bit time. In this way, even if the master is drifting "slow" and the slave device drifting "fast" (or vice versa), by the end of the bus message the clocking by the slave will nonetheless permit it to extract correct bus samples (of bits sent by the master) from the bus.

In many systems it will prove possible to provide generous margins on each of the specified parameters. For example in many systems it will prove possible to control drift in master and slaves so that cumulative drift errors by the end of a message time will be nowhere near to a bit time. Likewise in many systems it will prove possible to leave a substantial margin in the upper-limit frequency capabilities of the slave devices as compared with the actual frequencies employed by the master device. These margins help to minimize how often a message would need to be retransmitted due, for example, to a parity error. These margins also help a system designer at the time of system design, if off-the-shelf devices each offer generous margins thus permitting some flexibility in board layout and provision for optional later add-ons to the bus.

Again, as stated above, between the beginning and end of a particular bus transaction, all the clocks (master and slave) are required to be reasonably stable.

Stopping clocks. Those skilled in the art will be well aware that for many miniature products, the desire to maximize battery life leads to seemingly extreme measures such as shutting down oscillators whenever possible. This is because in many systems the oscillator or oscillators turn out to be among the chief battery drains. Of course this means that if a particular device within a product has had its oscillator halted, there is a need to get the oscillator restarted without undue delay at such time as the oscillator is again needed.

With many prior-art communications buses there is a need to keep oscillators running all of the time. For example a traditional UART (universal asynchronous receiver/transmitter) needs a clock running at all times, so that it can process any asynchronous message that may arrive on its serial bus at any time without warning. For many UARTs the clock needed is a clock running four or sixteen times faster than the fastest bit time defined for the baud rate on the data line.

With the present bus, however, it may be appreciated that all of the internal oscillators on the master and on all the slaves can be stopped until the bus operations are required, thus permitting low-power operation. To see this most clearly some discussion may be helpful. In particular, as will be described below, each slave device can wait in a "sleep" state (that is, with its oscillator turned off) until there is activity on the line. The activity prompts each slave to pay close attention to the bit times at the beginning of the message from the master. The slave will "synch" in the sense that will cause its oscillator to start and appropriate circuitry in the slave will do what is needed to arrive at-a clock signal that permits clocking in address and data information from the line.

Figure 4:
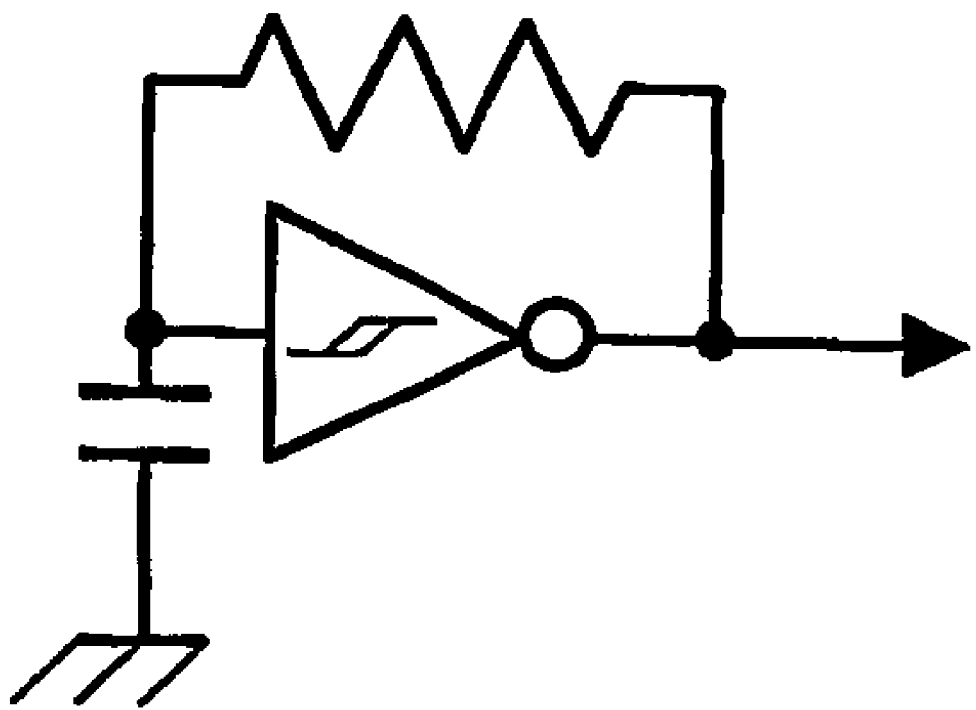
FIG. 4 is a functional block diagram of an exemplary oscillator.

As was mentioned above, if a particular device within a product has had its oscillator halted, there is a need to get the oscillator restarted without undue delay at such time as the oscillator is again needed. Those skilled in the art will have no difficulty selecting among well-known oscillators for this purpose. FIG. 4 is an example of an oscillator that will restart immediately. It is not particularly accurate and is not particularly stable in the long run. In particular it is not particularly temperature-stable. It will be appreciated, however, that for the system according to the invention, the oscillator needs to be stable only for the duration of a single bus transaction, and in normal conditions the maximum temperature change during a particular bus transaction is quite small. Thus this oscillator is one among many well-known oscillators that is quite sufficient for the operation of a slave on this bus. U.S. Pat. No. 6,501,342 entitled "Power-conserving external clock for use with a clock-dependent integrated circuit," assigned to the same assignee as the present invention, describes a clock which is able to sleep until an interrupt is received and is then able to resume stable oscillation in a very short time, thus being well suited to the type of operation described here.

As will be described below, the operations of the bus are further designed in such a way that the conflict between the drivers on the master and one or more slaves (that assert the Interrupt signal) is prevented. (A conflict may occur when at least two drivers are trying to set the bus line to opposing states. The high supply currents resulting from such conflicts are highly undesirable in operation, and may also damage the individual master or slave units.) As will also be described, the operations of the bus are further characterized by aspects of the bus protocol according to which the bus transactions have predetermined and fixed duration. Stated differently, the bus transactions have a duration which does not depend on varying transmitted data and varying addressing information. (This property is helpful in real-time systems where the transaction itself may be a part of a predetermined and critically constrained wait interval.) According to the protocol described below, slave devices 3 and 4 can only receive and transmit data in reply to a transaction started by the master device 1. The only signal which can be asserted by one or more slaves on their own (that is, in the absence of a transaction started by the master device 1) is the interrupt signal, which is defined to be a pulse of limited duration.

As mentioned previously, nothing about the teachings of the invention particutarly relies upon the polarity and voltage of particular states such as a quiescent bus state or a bus interrupt state. For convenience of discussion, however, the operations will be described in the arbitrary arrangement in which the interrupt signal is active low, and in which the pullup device is trying to set the bus line high.

Bus protocol. The protocol for the bus will now be described in some detail.

In the system described here, most of the time the bus is in the idle state. In the idle state all drivers, in the master and in all slaves, are turned off (floating), and the pull-up device maintains the high logic state of the bus line. According to the protocol described here, before starring any transaction, the master and/or slave units observe the bus line, and wait for it to become idle, if necessary.

Of course it is necessary to consider what happens if a master device starts a transaction at exactly the same time that a slave device asserts the interrupt signal In this system, the interaction of these two drivers does not produce a conflict condition since the activated interrupt signal and the first bit of the master's "start field" have the same logic state, and the interrupt signal is limited in duration to less then a single bit-time of the master's transmission. Since the only possible situation when two drivers are active at the same time is the simultaneous start of the interrupt from the slave and the start of the new transaction from the master, the driver conflict condition is always prevented.

Each transaction consists of the following stages (see FIG. 2 and FIG. 3):
Start;
Read or Write intention determination;
Addressing;
Bus direction reassignment (turn-around), if required;
Data;
Error Detection;
Bus direction reassignment (turn-around), if required;
Error detection and acknowledgement, and
Stop.

All transaction are asynchronous, with equal bit time for each and every bit.

The start stage should have at least three (3) elements, but may be extended to an arbitrary number of bits. It will be appreciated that the number of bits in the start stage needs to be known to, or previously programmed into, each and every device on the bus.

The start stage essentially consists of alternating high and low logical states of the bus, with each state having duration equal to a single bit time. The purpose of the start stage is to allow the determination (by each slave device) of the transmission speed and to synchronize the receiver (in each slave device) to the beginning of the message.

The read or write intention determination stage uses several bits to convey to the slave device or devices the intentions of the master device. Several bits (rather than just a single bit) are used to reduce the risk of a single incorrect bit changing the intended operation, and possibly creating the driver conflict condition, for example, a situation in which the master is trying to transmit information at the same time as a slave. In this example, as illustrated, the bit-pattern 0,1,1 denotes a write transaction (master to slave), and bit-pattern 1,1,0 denotes a read transaction (slave to master). All other patterns are rejected as invalid, and the transaction is ignored.

Figure 2:
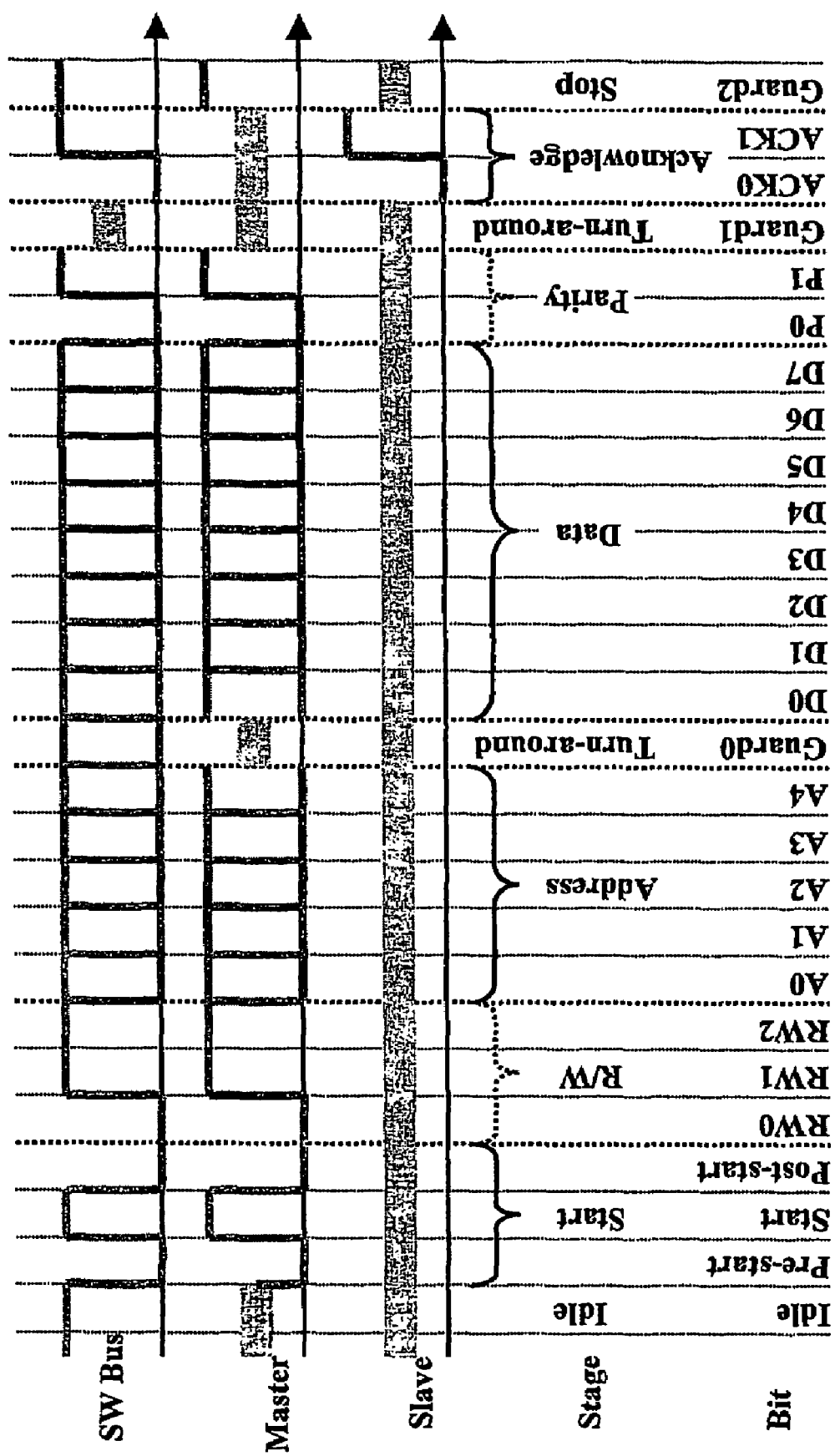
FIG. 2 is a state diagram showing time intervals and bit times for a write (master-to-slave) transaction.
Figure 3:
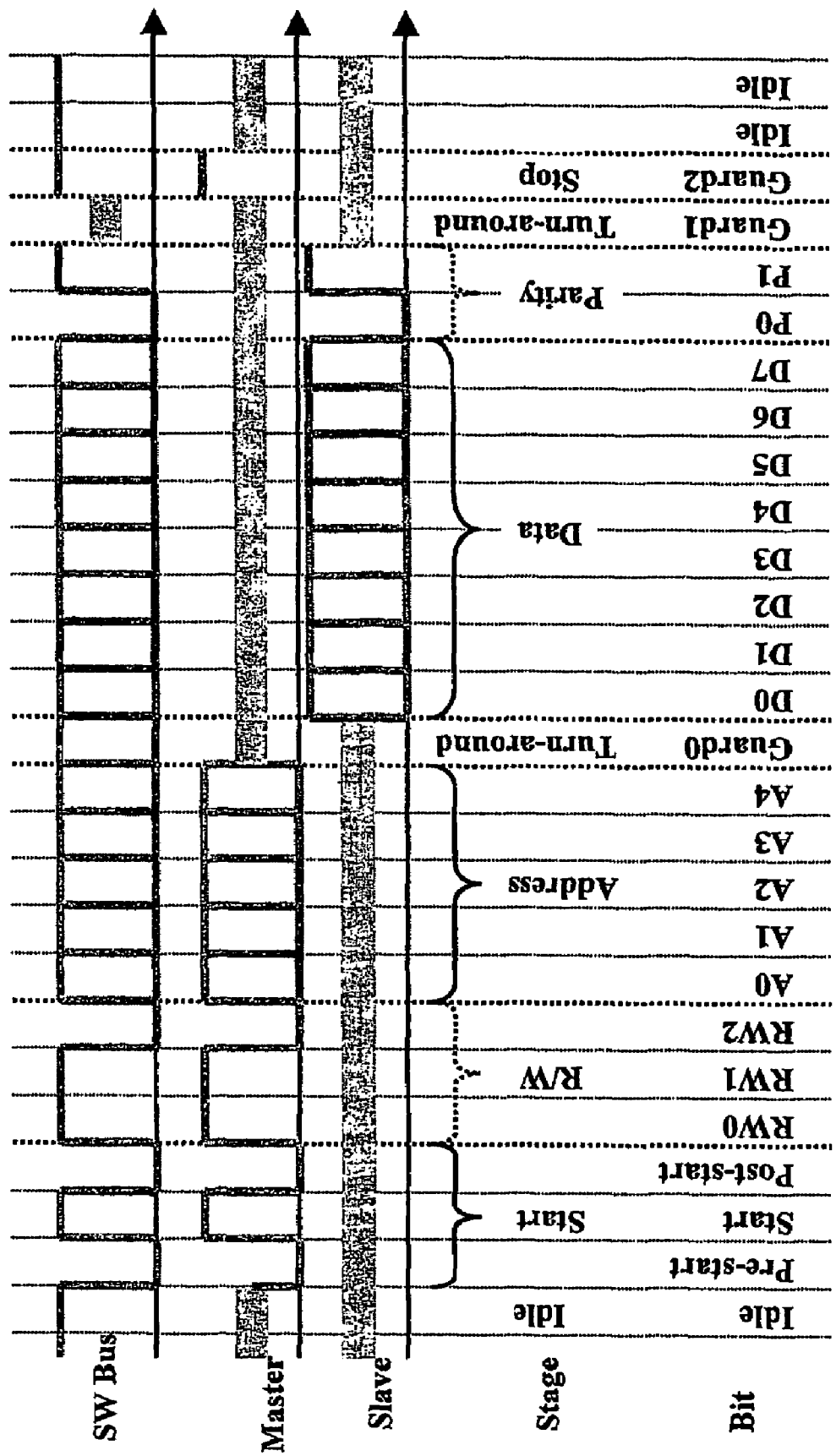
FIG. 3 is a state diagram showing time intervals and bit times for a read (slave-to-master) transaction.

The addressing stage provides the addresses for selection of individual devices connected to the Bus, as well as the addresses of various registers inside each of the device. Again, the number of address bits should be known (or set) in the master and all slave devices prior to operations. It is possible to operate some of the slaves with a lesser number of address bits, as long as the selection of each slave device can be made without ambiguity. An address field of five (5) bits is illustrated in FIG. 2 and FIG. 3. Optionally a particular address could be defined as a multicast address directed to all slave devices. Optionally some other particular address could be defined as a multicast address directed to particular ones of the slave devices, namely more than one and less than all of the slave devices. It will be appreciated that in the event of a multicast message it is not permitted for two or more slaves each to send an acklowledgment of receipt of the message, because such duplicate acknowledgments would risk collisions of bus data.

The bus direction reassignment (turn-around) stage provides an idle "slot" equal to the normal bit time, thus providing an interval for reversal of the information flow. It allows for the orderly and non-simultaneous disabling and enabling of the drivers on the master and slave devices. (in this context "non-simultaneous" means that there is no requirement that the disabling and enabling be simultaneous; the device that will transmit after the reversal has occurred can enable its driver slightly early or slightly late without risking an overlap with the "enabled" time of the driver for the device that was transmitting before the reversal occurred.) The turn-around stage appears in several positions during the transaction.

The data stage is when the actual information is transferred. The number of bits in the data stage can again be arbitrary, but needs to be known to the master and all slave units. A payload of eight (8) bits is illustrated in FIG. 2 and FIG. 3.

The error detection stage follows the data stage, and (in this exemplary embodiment) appends two parity bits at the end of the data stage. The second parity bit is simply an inverse of the first parity bit This prevents a permanently "stuck" line from indicating a correct parity for the message, no matter what data is transmitted. A specific parity value of 0,1 is illustrated in FIG. 2 and FIG. 3.

The error detection and acknowledgment stage is only used in the write transactions, when the slave acknowledges the receipt of information and (in this embodiment) retransmits the parity bits from the original message. Again, a specific parity and acknowledgment value of 0,1 is illustrated in FIG. 2.

The stop stage enforces an idle condition on the Bus for some time after the transaction. It may do so for several bit times, the exact number known to both master and all slaves. A single-bit stop time is illustrated in FIG. 2 and FIG. 3.

The bits during the bus direction reassignment (turn-around) stage and stop stage are also called "guard" bits, since they guard against the possibly of creating the driver conflict condition where the master and a slave device attempt simultaneously to drive the bus to nonidentical levels.

Parity. In the embodiment described here the system is able to discern whether a message has been accurately received by means of a parity check. The slave device receiving a message will calculate the parity of the message and will compare the calculated parity with the parity bit at the end of the message. Retransmission of the parity bit from the slave to the master permits the master to know that the slave has received the message. Likewise if the operation is a "master read" operation, then the slave will calculate a parity, and will append it to the data which it is sending to the master. The master then calculates the parity and compares this with the parity at the end of the message. This permits the master to know that the message was correctly received.

It will be appreciated by those skilled in the art that, as here, when a single parity bit is used to confirm accurate receipt of a message, there is possibility (however remote) of double-bit errors occurring which could (a) amount to inaccurate message receipt and (b) trick the receiving device into concluding that the receipt was error-free. Thus a parity approach as described here is appropriate only in environments in which it is safe to assume that double-bit errors are quite rare (or in environments where some higher-level protocol may permit detecting certain errors, or where errors are easily tolerated for some other reason). In noisier environments it may be appropriate to employ a more complex check such as a cyclic redundancy check (CRC) to confirm accurate receipt of a message. But in environments that are quiet enough that double-bit errors are rare (or where a higher-level protocol also catches errors, or where errors are easily tolerated for some other reason) it is wasteful of computational bandwidth and of hardware (and of bus bandwidth) to use a CRC where a single-bit parity check suffices.

It will also be appreciated that a device receiving a message having parity may follow either of two approaches in confirming parity. One approach is to calculate the message parity for all the bits other than the parity bit itself, and then to compare the calculated parity with the received first parity bit. (Here, with a two-bit parity message, there is also a check made to be sure that the second parity message bit is of opposite sense from the first bit.) Another approach is to calculate the message parity for all of the message bits including the first parity bit, and to see if the cumulative parity is of the expected sense (e.g. even or odd). (Here, with a two-bit parity message, there is likewise a check made to be sure that the second of the two parity message bits is opposite in sense to the first of the two parity message bits.)

In this context the term "acknowledgment" is meant to encompass a response that is a parity-bit response or a CRC response, with the type of response selected to match the needs of the system.

Clocking in slaves. As mentioned previously, when a slave "wakes up" due to activity on the bus, the activity prompts the slave to pay close attention to the bit times at the beginning of the message from the master. As seen in FIGS. 2 and 3, the start stage may be defined as three bit times, arbitrarily called a "prestart" bit, a "start" bit, and a "post-start" bit When the prestart bit happens, this wakes up the slave and it starts its oscillator. The oscillator is selected to be, for example, at least fifty-two times faster than the expected bit times for the bus transactions. By the time the start bit leading edge is detected, the oscillator has been running and stable for some number of oscillator cycles. The slave, in an exemplary embodiment, counts its oscillator pulses from the leading edge of the start bit to the trailing edge of the start bit. This count is stored and is used by the slave during the rest of the bus transaction.

Stated differently, the slave determines the bit starting and ending times for the remaining bits of the transaction by detecting and analyzing the bus states of the start stage. The slave then receives bits from the master according to the determined bit time and, if necessary, transmits bits to the master according to the determined bit time.

In the case of a "write" transaction (e.g. FIG. 2) the slave uses the count to select sampling times that are intended to fall in the middle of each of the bit times of the transaction for the RW stage, the address stage, the data stage, and the parity stage. If the slave is supposed to send an acknowledgment, then the count is used to select the starting and ending times for the two bits of the acknowledgment.

In the case of a "read" transaction (e.g. FIG. 3) the slave uses the count to select sampling times that are intended to fall in the middle of each of the bit times of the transaction for the RW stage and the address stage. If the slave is supposed to send a response, then the count is used to select the starting and ending times for the bits of the the data stage, and the parity stage.

It will be appreciated that in some systems it may happen that a common clock is being used by a particular slave as well as by the master. In such a case, the slave can use the common clock for determining the bit times. In such a case the bus transactions are not, strictly speaking, asynchronous. In such a case it may turn out that the slave can operate with as little as four clocks per bit time, and as little as two clocks per bit time for simple "write" transactions.

Powering down the oscillator in a slave. As mentioned earlier, a slave device's power budget includes the power used to operate its oscillator. Thus it is desirable, when possible, to let a slave go to "sleep" which, among other things, means its oscillator does not need to be running. It will be appreciated that the designer of a slave device is able to choose among several options in deciding when the slave can go to sleep. For example, in some applications for a write transaction (e.g. FIG. 2) a particular slave on the bus will remain awake long enough to calculate the parity, and will then go to sleep immediately thereafter if the address is not the address of the particular slave. Yet in other applications for a write transaction (e.g. FIG. 2) a particular slave on the bus will remain awake only long enough to receive the address, and will then go to sleep immediately thereafter if the address is not the address of the particular slave. (This saves energy to the oscillator during the data and parity stages, and saves the computational cost of computing the parity.) For a write transaction, a particular slave on the bus may remain awake long enough to receive the address, and will then go to sleep immediately thereafter if the address is not the address of the particular slave.

Determining the source of an interrupt. It is instructive to consider what happens when a slave pulls an interrupt down.

The master, at this point, merely knows that a slave pulled an interrupt down, but does not know which slave did so. In such a case, preferably the master polls the slaves and thus determines which slave generated the interrupt. In a simple case the master would poll the slaves seriatim based on the addressing system being used. In some systems, however, it may be known that the slaves differ in the urgency of servicing their interrupts in which case the master may poll first the slaves which (if they have an interrupt at all) have urgent interrupts.

It is also instructive to consider how a master will know which addresses on the bus are active, that is, which addresses represent slaves that are actually present in the system. In some cases a single system designer may be in a position to determine which addresses are in use and which are not, because the designer is responsible for all devices on the bus. In such a case the master may be hard-coded with information about the active addresses. In the event of an interrupt, this saves having to poll addresses for which there is no responsive device.

In other cases the system designer may not have control over all placement of devices on the bus, in which case it may prove necessary at some initial configuration time (e.g. at system power-up) to poll all possible bus addresses to develop a list of all slave devices that turn out to be present at the time of system power-up. It is then interesting to consider what would happen if a slave device were added to the bus after the initial polling-of-all-addresses. If that slave were to generate an interrupt, the master would have to repeat the polling-of-all-addresses to learn the address of the newly added slave device.

The overhead associated with a polling-of-all-devices need not be prohibitive. In the example given here, there may be five address bits. This defines at most thirty-two slave devices, and thus only thirty-two polls would be needed to check for the presence or absence of each of the thirty-two possible devices.

Minimizing risk of lost interrupts. The system according to the invention, as mentioned above, avoids bus contention. In this regard, each of the devices (master and slaves) has a mechanism for checking if the bus is free, before starting any transaction. (This mechanism simply checks to see if the bus is in its quiescent state.) It will be appreciated that for this to work well, the bus must in its entirety be short in length as compared with the distance that light would travel during a bit time. Stated differently, if a master and slave were on a very long bus, then one device might sample the bus to see if it is free, only to have a pulse arrive from the other end of the bus at an inconvenient moment, part way through an attempted bus transaction. In the typical battery-powered appliances described above (e.g. cell phone, laptop computer, PDA) the form factor of the appliance imposes a natural upper bound on the length of the bus, e.g. much shorter than one meter, and this means that a pulse from the other end of the bus will not take very long to arrive.

Stated differently, there is the problem that a device might sample the bus, conclude (incorrectly) that the bus is idle, and attempt a transaction which will fail due to some other transaction being attempted. Keeping the bus short minimizes how often it will happen that a device reaches an incorrect conclusion as to whether the bus is idle.

If the master inadvertently starts the transaction at the same time that a slave indicates an interrupt, or if it inadvertently starts the transaction within a small window of the time that a slave indicates an interrupt, then of course the interrupt will be lost. Preferably, then, each slave will be designed so that it recognizes that its interrupt is lost (e.g. by monitoring the bus and noting that its interrupt is badly formed). In that event, the slave activates its interrupt again some short time after the current transaction is finished.

Yet another protective measure can be imposed to minimize the risk that a slave's interrupt would go unanswered. This can be employed instead of the monitoring just mentioned, or preferably is employed in addition to such monitoring. In this protective measure, each slave that determines that it needs to have an interrupt serviced will set a bit in an appropriate internal register. This bit is indicative of the need to have an interrupt serviced. With such a slave, the slave retransmits the lost or unserviced interrupt after every bus transaction until the interrupt is specifically cleared in the appropriate internal register. The master, having serviced the interrupt, sends a message to the slave telling it to clear the bit. Ideally the master would send such a message right away after servicing the interrupt, although in some situations where the master is needed for other tasks, the clearing might have to wait until the master is not so busy.

This approach has the possible drawback that it may use up bus bandwidth due to the sending of a large number of otherwise unnecessary duplicate interrupts, for example in situation where the interrupt request bit is specifically not cleared to save time.

In one embodiment of the invention it is contemplated that this capability (according to which the slave sends its interrupts repeatedly until a flag is cleared) may be programmable. In such an embodiment the master (or other equipment external to the slave) will be able to choose whether to enable the "extra" interrupt pulses (which reduces the risk of a lost interrupt) or to disable the "extra" interrupt pulses (which reduces the risk of wasted bus bandwidth). Alternatively the slave may be programmable as to how often it generates an interrupt when its flag is set, e.g. no more often than an interval defined as some number of miliseconds, or no more often than every second or third bus transaction.

It will also be appreciated that a slave may be configured so as to prioritize its own interrupt events. Certain interrupt events might prompt the slave to generate only a single interrupt, while other interrupt events might prompt the slave to generate repeated interrupts until cleared.

It will also be appreciated that the master and slaves could be configured so that a particular multicast message is understood as a query to all of the slaves as to whether any of the slaves happens to have an uncleared interrupt. The master could transmit this multicast message from time to time so as to catch any uncleared interrupts.

Taking into account the many teachings of the above discussion, those skilled in the art will have no difficulty devising myriad obvious variations and improvements upon the invention, all of which are intended to be encompassed within the claims that follow.

The invention claimed is:

1. A method for use in a system comprising a master and a slave connected by a single-wire asynchronous bus, the master operating in a first mode in which its clock is active and a second mode in which its clock is inactive, the method comprising the steps of:
   in the master, entering the second mode;
   at the slave, transmitting an interrupt comprising drawing the bus away from a quiescent level for a finite interval;
   in the master, entering the first mode in response to the interrupt;
   at the master, after entering the first mode, transmitting a start stage comprising at least three alternating bus states with at least one of the states having a duration defining a predetermined bit time; and
   at the slave, determining the bit starting and ending times for the remaining bits of a transmission by detecting and analyzing the bus states of the start stage.

2. A method for use in a system comprising a master and a slave connected by a single-wire asynchronous bus, the slave operating in a first mode in which its clock is active and a second mode in which its clock is inactive, the method comprising the steps of:
- in the slave, entering the second mode;
- at the master, transmitting a start stage comprising at least three alternating bus states with at least one of the states having a duration defining a predetermined bit time;
- in the slave, entering the first mode in response to the start stage; and
- at the slave, determining the bit starting and ending times for the remaining bits of a transmission by detecting and analyzing the bus states of the start stage.

3. A method for use in a system comprising a master and a plurality of slaves, all connected by a single-wire asynchronous bus, each slave operating in a first mode in which its clock is active and a second mode in which its clock is inactive, the method comprising the steps of:
- in each of the slaves, entering the second mode;
- at the master, transmitting a start stage comprising at least three alternating bus states with at least one of the states having a duration defining a predetermined bit time;
- in each of the slaves, entering the first mode in response to the start stage; and
- at each of the slaves, determining the bit starting and ending times for the remaining bits of a transmission by detecting and analyzing the bus states of the start stage.

4. A method for use in a system comprising a master and a plurality of slaves, all connected by a single-wire asynchronous bus, each slave operating in a first mode in which its clock is active and a second mode in which its clock is inactive, each slave having a respective unique address, the method comprising the steps of:
- at each of the slaves, entering the second mode;
- at the master, transmitting a start stage comprising at least three alternating bus states with at least one of the states having a duration defining a predetermined bit time;
- in each of the slaves, entering the first mode in response to the start stage;
- at each of the slaves, determining the bit starting and ending times for the remaining bits of a transmission by detecting and analyzing the bus states of the start stage;
- at the master, transmitting an addressing stage after the start stage, the addressing stage comprising a transmitted address;
- at each of the slaves, receiving the transmitted address according to the determined bit time;
- at each of the slaves, comparing the received address with the respective unique address thereof.

5. The method of claim 4, further characterized in that in the event that one of the slaves finds a match between the received address and the respective unique address thereof, the one of the slaves responds to the master in a way differing from any of the other slaves.

6. The method of claim 4, further characterized in that in the event that one of the slaves finds no match between the received address and the respective unique address thereof, the one of the slaves does not respond to the master.

7. The method of claim 4, further comprising the steps of:
- at the master, transmitting a data stage after the addressing stage, the data stage comprising transmitted data;
- at one of the slaves, receiving the transmitted data according to the determined bit time.

8. The method of claim 7, further comprising the steps of:
- at the one of the slaves, confirming accurate receipt of the address and the data, and in the event of a match between the received address and the respective unique address, transmitting an acknowledgment on the bus according to the determined bit time.

9. The method of claim 4, further comprising the steps of:
- at one of the slaves, in the event of a match between the received address and the respective unique address, transmitting a data stage according to the determined bit time, the data stage comprising transmitted data; and
- at the master, receiving the transmitted data according to the predetermined bit time.

10. A method for use in a system comprising a master and a plurality of slaves, all connected by a single-wire asynchronous bus, each slave having a respective unique address, the method comprising the steps of:
- at the master, transmitting a start stage comprising at least three alternating bus states with at least one of the states having a duration defining a predetermined bit time;
- at each of the slaves, determining the bit starting and ending times for the remaining bits of a transmission by detecting and analyzing the bus states of the start stage;
- at the master, transmitting an addressing stage after the start stage, the addressing stage comprising a transmitted address;
- at each of the slaves, receiving the transmitted address according to the determined bit time;
- at each of the slaves, comparing the received address with the respective unique address thereof.

11. The method of claim 10, further characterized in that in the event that one of the slaves finds a match between the received address and the respective unique address thereof, the one of the slaves responds to the master in a way differing from any of the other slaves.

12. The method of claim 10, further characterized in that in the event that one of the slaves finds no match between the received address and the respective unique address thereof, the one of the slaves does not respond to the master.

13. The method of claim 10, further comprising the steps of:
- at the master, transmitting a data stage after the addressing stage, the data stage comprising transmitted data;
- at one of the slaves, receiving the transmitted data according to the determined bit time.

14. The method of claim 13, further comprising the steps of:
- at the one of the slaves, confirming accurate receipt of the address and the data, and in the event of a match between the received address and the respective unique address, transmitting an acknowledgment on the bus according to the determined bit time.

15. The method of claim 10, further comprising the steps of:
- at one of the slaves, in the event of a match between the received address and the respective unique address, transmitting a data stage according to the determined bit time, the data stage comprising transmitted data; and
- at the master, receiving the transmitted data according to the predetermined bit time.

16. A device for use with an asynchronous serial bus on which a start stage may be transmitted comprising at least three alternating bus states with at least one of the states having a duration defining a bit time, and on which an address stage comprising a plurality of address bits may subsequently be transmitted in accordance with the bit time and its phase, and on which a data stage may subsequently be transmitted in accordance with the bit time, the device having a unique address, the device comprising:
- a line driver connected with the bus;
- a line receiver connected with the bus;
- means responsive to the line receiver for determining the bit starting and ending times for the remaining bits of a transmission by detecting and analyzing the bus states of the start stage;

means responsive to the line receiver for reading the address stage with respect to the determined bit time and deriving the address therefrom;

means comparing the derived address with the unique address, and means responsive to the line receiver for reading the data stage with respect to the determined bit time and deriving the data therefrom.

17. The device of claim 16 wherein the reading of the data stage is performed only in the event of a match between the derived address and the unique address.

18. The device of claim 16 further comprising means confirming accurate receipt by the device of the address and data, and means transmitting an acknowledgment thereof by means of the line driver, in accordance with the determined bit time, only in the event of a match between the derived address and the unique address.

19. A device for use with an asynchronous serial bus on which a start stage may be transmitted comprising at least three alternating bus states with at least one of the states having a duration defining a bit time, and on which an address stage comprising a plurality of address bits may subsequently be transmitted in accordance with the bit time and its phase, the device having a unique address, the device comprising:

a line driver connected with the bus;

a line receiver connected with the bus;

means responsive to the line receiver for determining the bit starting and ending times for the remaining bits of a transmission by detecting and analyzing the bus states of the start stage;

means responsive to the line receiver for reading the address stage with respect to the determined bit time and deriving the address therefrom;

means comparing the derived address with the unique address, and means responsive to a match between the derived address and the unique address for transmitting, by means of the line driver, a data stage with respect to the determined bit time.

20. A device for use with an asynchronous serial bus on which a start stage may be transmitted comprising at least three alternating bus states with at least one of the states having a duration defining a bit time, and on which an address stage comprising a plurality of address bits may subsequently be transmitted in accordance with the bit time and its phase, and on which a data stage may subsequently be transmitted in accordance with the bit time, the device having a unique address, the device operating according to a first mode in which an oscillator oscillates and according to a second mode in which it does not, the device comprising:

a line driver connected with the bus;

a line receiver connected with the bus;

means responsive to the line receiver for determining the bit starting and ending times for the remaining bits of a transmission by detecting and analyzing the bus states of the start stage;

means responsive to the line receiver for reading the address stage with respect to the determined bit time and deriving the address therefrom;

means comparing the derived address with the unique address;

means responsive to the line receiver for reading the data stage with respect to the determined bit time and deriving the data therefrom; and means responding to a state change on the bus, in the event of the device being in the second mode, for causing a transition from the second mode to the first mode.

21. The device of claim 20 wherein the reading of the data stage is performed only in the event of a match between the derived address and the unique address.

22. The device of claim 20 further comprising means confirming accurate receipt by the device of the address and data, and means transmitting an acknowledgment thereof by means of the line driver, in accordance with the determined bit time, only in the event of a match between the derived address and the unique address.

23. A device for use with an asynchronous serial bus on which a start stage may be transmitted comprising at least three alternating bus states with at least one of the states having a duration defining a bit time, and on which an address stage comprising a plurality of address bits may subsequently be transmitted in accordance with the bit time and its phase, and on which a data stage may subsequently be transmitted in accordance with the bit time, the device having a unique address, the device operating according to a first mode in which an oscillator oscillates and according to a second mode in which it does not, the device comprising:

a line driver connected with the bus;

a line receiver connected with the bus;

means responsive to the line receiver for determining the bit starting and ending times for the remaining bits transmission, by detecting and analyzing the bus states of the start stage;

means responsive to the line receiver for reading the address stage with respect to the determined bit time and deriving the address therefrom;

means comparing the derived address with the unique address;

means responsive to a match between the derived address and the unique address for transmitting, by means of the line driver, a data stage with respect to the determined bit time; and means responding to a state change on the bus, m the event of the device being in the second mode, for causing a transition from the second mode to the first mode.

24. A system comprising a master and a slave for use with an asynchronous serial bus;

the master comprising:

a line driver connected with the bus;

a line receiver connected with the bus;

means transmitting a start stage by means of the line driver, the start stage comprising at least three alternating bus states with at least one of the states having a duration defining a bit time;

means transmitting an address stage by means of the line driver after the start stage, the address stage comprising a plurality of address bits representing an address, in accordance with the bit time and its phase;

means transmitting a data stage by means of the line driver after the address stage, the data stage comprising a plurality of data bits representing data, in accordance with the bit time, the slave having a unique address, the slave comprising:

a line driver connected with the bus;

a line receiver connected with the bus;

means responsive to the line receiver for determining the bit starting and ending times for the remaining bits of a transmission by detecting and analyzing the bus states of the start stage;

means responsive to the line receiver for reading the address stage with respect to the determined bit time and deriving the address therefrom;

means comparing the derived address with the unique address; and means responsive to the line receiver for reading the data stage with respect to the determined bit time and deriving the data therefrom.

25. The system of claim 24 further characterized in that the reading of the data stage by the slave is performed only in the event of a match between the derived address and the unique address.

26. The system of claim 24 further characterized in that the master is operable in a first mode in which an oscillator oscillates and a second mode in which it does not, and in that the slave is operable in a first mode in which an oscillator oscillates and a second mode in which it does not, the master further comprising means responsive to activity on the bus in the event the master is in the second mode for causing the master to enter the first mode, the slave further comprising means responsive to activity on the bus in the event the slave is in the second mode for causing the slave to enter the first mode.

27. The system of claim 24 further comprising means in the slave confirming accurate receipt by the slave of the address and data, and means transmitting an acknowledgment thereof by means of the line driver thereof, in accordance with the determined bit time, only in the event of a match between the derived address and the unique address.

28. A system comprising a master and a slave for use with an asynchronous serial bus;

the master comprising:
a line driver connected with the bus;
a line receiver connected with the bus;
means transmitting a start stage by means of the line driver, the start stage comprising at least three alternating bus states with at least one of the states having a duration defining a bit time;
means transmitting an address stage by means of the line driver after the start stage, the address stage comprising a plurality of address bits representing an address, in accordance with the bit time and its phase;

the slave having a unique address, the slave comprising:
a line driver connected with the bus;
a line receiver connected with the bus;
means responsive to the line receiver for determining the bit starting and ending times for the remaining bits of a transmission by detecting and analyzing the bus states of the start stage;
means responsive to the line receiver for reading the address stage with respect to the determined bit time and deriving the address therefrom;
means comparing the derived address with the unique address; and
means responsive a match between the derived address and the unique address for transmitting, by means of the line driver, a data stage with respect to the determined bit time, the data stage comprising a plurality of data bits representing data;

the master further comprising:
means receiving the data stage by means of the line receiver after the address stage, in accordance with the bit time and its phase, and deriving the data therefrom.

29. A system comprising a master and a plurality of slaves for use with an asynchronous serial bus;

the master comprising:
a line driver connected with the bus;
a line receiver connected with the bus;
means transmitting a start stage by means of the line driver, the start stage comprising at least three alternating bus states with at least one of the states having a duration defining a bit time;
means transmitting an address stage by means of the line driver after the start stage, the address stage comprising a plurality of address bits indicative of an address in accordance with the bit time and its phase;

each slave having a unique address, each slave comprising:
a line driver connected with the bus;
a line receiver connected with the bus;
means responsive to the line receiver for determining the bit starting and ending times for the remaining bits of a transmission by detecting and analyzing the bus states of the start stage;
means responsive to the line receiver for reading the address stage with respect to the determined bit time and deriving the address therefrom; and
means comparing the derived address with the unique address, and
means responsive a match between the derived address and the unique address for transmitting, by means of the line driver, a data stage with respect to the determined bit time, the data stage comprising a plurality of data bits representing data;

the master further comprising:
means receiving the data stage by means of the line receiver after the address stage, in accordance with the bit time and its phase, and deriving the data therefrom.

30. A device for use with an asynchronous serial bus, the device comprising:
a line driver connected with the bus;
a line receiver connected with the bus;
means transmitting a start stage by means of the line driver, the start stage comprising at least three alternating bus states with at least one of the states having a duration defining a bit time;
means transmitting an address stage by means of the line driver after the start stage, the address stage comprising a plurality of address bits indicative of an address in accordance with the bit time and its phase;
means receiving a data stage comprising bits indicative of data by means of the line receiver after the address stage, in accordance with the bit time and its phase, and deriving the data therefrom.

31. A method for use with a device and an asynchronous serial bus, the method comprising the steps of:
transmitting a start stage by means of a line driver to the bus, the start stage comprising at least three alternating bus states with at least one of the states having a duration defining a bit time;
transmitting an address stage by means of the line driver after the start stage, the address stage comprising a plurality of address bits indicative of an address in accordance with the bit time and its phase;
receiving a data stage comprising bits indicative of data by means of a line receiver from the bus after the address stage, in accordance with the bit time and its phase, and deriving the data therefrom.

32. A system comprising a master and a plurality of slaves for use with an asynchronous serial bus;

the master comprising:
a line driver connected with the bus;
a line receiver connected with the bus;
means transmitting a start stage by means of the line driver, the start stage comprising at least three alternating bus states with at least one of the states having a duration defining a bit time;

means transmitting an address stage by means of the line driver after the start stage, the address stage comprising a plurality of address bits representing an address, in accordance with the bit time and its phase;

means transmitting a data stage by means of the line driver after the address stage, the data stage comprising a plurality of data bits representing data, in accordance with the bit time, each slave having a unique address, each slave comprising:
a line driver connected with the bus;
a line receiver connected with the bus;
means responsive to the line receiver for determining the bit starting and ending times for the remaining bits of a transmission by detecting and analyzing the bus states of the start stage;
means responsive to the line receiver for reading the address stage with respect to the determined bit time and deriving the address therefrom;
means comparing the derived address with the unique address; and
means responsive to the line receiver for reading the data stage with respect to the determined bit time and deriving the data therefrom.

33. The system of claim 32 further characterized in that the reading of the data stage by each slave is performed only in the event of a match between the derived address and the unique address.

34. The system of claim 32 further characterized in that the master is operable in a first mode in which an oscillator oscillates and a second mode in which it does not, and in that each slave is operable in a first mode in which an oscillator oscillates and a second mode in which it does not, the master further comprising means responsive to activity on the bus in the event the master is in the second mode for causing the master to enter the first mode,
each slave further comprising means responsive to activity on the bus in the event the slave is in the second mode for causing the slave to enter the first mode.

35. The system of claim 32 further comprising
means in each slave confirming accurate receipt by the slave of the address and data, and
means transmitting an acknowledgment thereof by means of the line driver thereof, in accordance with the determined bit time, only in the event of a match between the derived address and the unique address.

36. A method for use in a system comprising a master and a slave connected by a single-wire asynchronous bus, the slave having a respective unique address, the method comprising the steps of:

at the master, transmitting a start stage comprising at least three alternating bus states with at least one of the states having a duration defining a predetermined bit time;
at the slave, determining the bit starting and ending times for the remaining bits of a transmission by detecting and analyzing the bus states of the start stage;
at the master, transmitting an addressing stage after the start stage, the addressing stage comprising a transmitted address;
at the slave, receiving the transmitted address according to the determined bit time;
at the slave, comparing the received address with the respective unique address thereof.

37. The method of claim 36, further characterized in that in the event that the slave finds no match between the received address and the respective unique address thereof, the slave does not respond to the master.

38. The method of claim 36, further comprising the steps of:
at the master, transmitting a data stage after the addressing stage, the data stage comprising transmitted data;
at the slave, receiving the transmitted data according to the determined bit time.

39. The method of claim 38, further comprising the steps of:
at the slave, confirming accurate receipt of the address and the data, and in the event of a match between the received address and the respective unique address, transmitting an acknowledgment on the bus according to the determined bit time.

40. The method of claim 36, further comprising the steps of:
at the slave, in the event of a match between the received address and the respective unique address, transmitting a data stage according to the determined bit time, the data stage comprising transmitted data; and
at the master, receiving the transmitted data according to the predetermined bit time.

41. A method for use with a device connected to a single-wire asynchronous bus at which a start stage comprising at least three alternating bus states with at least one of the states having a duration defining a predetermined bit time may be transmitted, and at which an addressing stage may be transmitted after the start stage, the addressing stage comprising a transmitted address, the device having a unique address, the method comprising the steps of:

determining the bit starting and ending times for the remaining bits of a transmission by detecting and analyzing the bus states of the start stage;
receiving the transmitted address according to the determined bit time; and
comparing the received address with the respective unique address thereof.

42. The method of claim 41, in which a data stage may be transmitted after the addressing stage, the data stage comprising transmitted data, the method further comprising the steps of:
receiving the transmitted data according to the determined bit time.

43. The method of claim 42, further comprising the steps of:
confirming accurate receipt of the address and the data, and in the event of a match between the received address and the respective unique address, transmitting an acknowledgment on the bus according to the determined bit time.

44. The method of claim 41, further comprising the steps of:
in the event of a match between the received address and the respective unique address, transmitting a data stage according to the determined bit time, the data stage comprising transmitted data.

* * * * *